United States Patent
Dodge

(10) Patent No.: US 7,698,495 B2
(45) Date of Patent: Apr. 13, 2010

(54) COMPUTER SYSTEM HAVING LOGICALLY ORDERED CACHE MANAGEMENT

(75) Inventor: Dan Dodge, Nepean (CA)

(73) Assignee: QNZ Software Systems GmbH & Co. KG, Karlsbad (DE)

( * ) Notice: Subject to any disclaimer, the term of this patent is extended or adjusted under 35 U.S.C. 154(b) by 101 days.

(21) Appl. No.: 11/450,140

(22) Filed: Jun. 9, 2006

(65) Prior Publication Data

US 2007/0005894 A1 Jan. 4, 2007

Related U.S. Application Data

(60) Provisional application No. 60/696,494, filed on Jul. 1, 2005.

(51) Int. Cl.
G06F 12/00 (2006.01)
G06F 13/00 (2006.01)
G06F 13/28 (2006.01)

(52) U.S. Cl. .............. 711/3; 711/118; 710/22
(58) Field of Classification Search ............. 711/141, 711/3, 118; 710/22
See application file for complete search history.

(56) References Cited

U.S. PATENT DOCUMENTS

| | | | | |
|---|---|---|---|---|
| 4,564,900 A | * | 1/1986 | Smitt | 709/212 |
| 4,926,317 A | | 5/1990 | Wallach et al. | |
| 4,945,475 A | | 7/1990 | Bruffey et al. | |
| 5,187,786 A | | 2/1993 | Densmore et al. | |
| 5,276,840 A | * | 1/1994 | Yu | 710/35 |
| 5,455,944 A | | 10/1995 | Haderle et al. | |
| 5,459,850 A | * | 10/1995 | Clay et al. | 711/171 |
| 5,530,849 A | | 6/1996 | Hanushevsky et al. | |
| 5,539,895 A | * | 7/1996 | Bishop et al. | 711/138 |
| 5,588,129 A | * | 12/1996 | Ballard | 711/113 |

(Continued)

FOREIGN PATENT DOCUMENTS

JP   62-186361 A   8/1987

(Continued)

OTHER PUBLICATIONS

Cárdenas, Alfonso F. "Analysis and Performance of Inverted Data Base Structures." IBM Research Laboratory, San Jose, Communication of ACM May 1975, vol. 18, No. 5, pp. 253-263.

(Continued)

*Primary Examiner*—Stephen C Elmore
*Assistant Examiner*—Mark A Giardino, Jr.
(74) *Attorney, Agent, or Firm*—Brinks Hofer Gilson & Lione

(57) ABSTRACT

A computer system is set forth that includes a processor, general memory storage, and cache memory for temporarily storing selected data requested from the general memory storage. The computer system also may include file system software that is executed by the processor. The file system software may be used to manage the file data and the structure of the file system for files stored on the general memory storage. Management of the cache memory is placed under the control of cache management software. The cache management software is executed by the processor to manage the contents of the cache memory pursuant to cache hit and cache miss criterion. Sections of the cache memory are organized by the cache management software based on logical addresses of file data requested from the general memory storage.

8 Claims, 11 Drawing Sheets

U.S. PATENT DOCUMENTS

| | | | |
|---|---|---|---|
| 5,809,527 A * | 9/1998 | Cooper et al. ............... | 711/133 |
| 6,058,400 A | 5/2000 | Slaughter | |
| 6,292,808 B1 | 9/2001 | Obermarck et al. | |
| 6,571,259 B1 | 5/2003 | Zheng et al. | |
| 6,591,376 B1 | 7/2003 | VanRooven et al. | |
| 6,606,628 B1 | 8/2003 | Monsen et al. | |
| 6,748,491 B2 | 6/2004 | Rodriguez | |
| 6,754,696 B1 | 6/2004 | Kamath et al. | |
| 6,845,401 B1 | 1/2005 | Papadopoulos et al. | |
| 6,856,993 B1 | 2/2005 | Verma et al. | |
| 7,047,257 B2 | 5/2006 | Fletcher et al. | |
| 7,139,752 B2 | 11/2006 | Broder et al. | |
| 7,181,463 B2 | 2/2007 | Moore et al. | |
| 7,191,185 B2 | 3/2007 | Dweck et al. | |
| 2002/0174295 A1 | 11/2002 | Ulrich et al. | |
| 2005/0149525 A1 | 7/2005 | Verma et al. | |
| 2007/0005560 A1 | 1/2007 | Dodge | |
| 2007/0005614 A1 | 1/2007 | Dodge | |
| 2007/0005615 A1 | 1/2007 | Dodge | |
| 2007/0005627 A1 | 1/2007 | Dodge | |
| 2007/0005874 A1 | 1/2007 | Dodge | |
| 2007/0113120 A1 | 5/2007 | Dodge | |

FOREIGN PATENT DOCUMENTS

| | | |
|---|---|---|
| JP | 06-139124 A | 5/1994 |

OTHER PUBLICATIONS

Colyer, A. M. "Displaying and Manipulating Relationships." IBM Technical Disclosure Bulletin, Dec. 1995, vol. 38, Issue No. 12, pp. 391-396.

QNX Software Systems, "Embedded transaction filesystem (ETFS)," *System Architecture*, 2004, pp. 193-198.

* cited by examiner

COMPUTER SYSTEM HAVING LOGICALLY ORDERED CACHE MANAGEMENT

PRIORITY CLAIM

This application claims the benefit of priority from U.S. Provisional Application No. 60/696,494, filed Jul. 1, 2005, which is incorporated herein by reference.

BACKGROUND OF THE INVENTION

1. Technical Field

This invention is generally directed to a cache management system for use in a computer, embedded controller, or the like.

2. Related Art

Computers, embedded controllers, and other processor based systems typically employ multiple memory storages arranged at different levels of the memory hierarchy. Higher levels of the hierarchy are further removed from the processor than lower levels. As the distance from the processor increases, the memory capacity and the access time both increase. For example, general memory data storage may be used at a high level of the memory storage hierarchy to store and maintain the significant volumes of data used in the overall system. The general memory data storage may take on a variety of different forms including, but not limited to, hard disk drives, floppy disk drives, optical drives, flash storage, or the like. These types of general memory storages are often chosen for this high level of the memory hierarchy because of their significant storage capacities.

Although these general memory storages may store and maintain large volumes of data, direct access of the data by the processor may prove to be inefficient because of the large access times associated with the devices. Accordingly, processing systems may employ a cache at an intermediate level of the memory hierarchy. A cache allows data to be read and written at a higher speed than would otherwise occur in a direct access arrangement. The cache may reside in an intermediate storage, such as in a random access memory (RAM), that exhibits faster access times than the general memory storage.

The cache may be used to store selected data from various files that are in an open state. Files are placed in an open state when software applications executed by the processor place requests to access the file data. When reading data, a cache lookup is performed to search the cache memory. The search is executed to determine whether the requested file data is included in the data that has been selected for storage in the cache. A cache hit occurs when the requested file data is available from the cache. In such instances, the requested data is accessed directly in the cache memory as opposed to the general memory storage. A net savings in the time required to access the data is realized with a cache hit.

A cache miss occurs when the requested data is not located in cache memory. When a cache miss occurs, the requested data is accessed from the general memory storage. Additionally, memory in the cache may be filled using data selected from the corresponding file on the general memory storage. The selected data may be chosen to increase the probability that future access requests result in cache hits. When the cache memory is full, one or more of the cache entries may be replaced with other file data that is calculated to increase the likelihood of cache hits.

When writing blocks to the data storage, the file system may pool up a number of blocks to be written. This minimizes the frequency with which blocks are written to the general memory storage. The cache may be flushed—i.e. completely written out to the device—on a periodic basis, when cache space is exhausted, a specific threshold is reached, or a request is made to synchronize the state of files of the file system.

In conventional systems, logical-to-physical address mappings must be applied prior to caching operations so that the cache is completely organized on the basis of the physical addresses of the file data. This organizational structure leads to problems when write operations are triggered. Either data is inefficiently written to the storage unit, or CPU processing time or separate "scatter-gather" DMA controllers are required to organize the data to be written to the memory storage units in physically local sections. Similarly, requests for data from the same often must be serviced from geographically dispersed regions of the cache. Accordingly, an alternative to the traditional cache management and structure is needed.

SUMMARY

A computer system is set forth that includes a processor, general memory storage, and cache memory for temporarily storing selected data requested from the general memory storage. The computer system also may include file system software that is executed by the processor. The file system software manages the file data and the structure of the file system for files stored on the general memory storage. Management of the cache memory may be placed under the control of cache management software. The cache management software may be executed by the processor to manage the contents of the cache memory pursuant to cache hit and cache miss criterion. Sections of the cache memory may be organized by the cache management software based on logical addresses of file data requested from the general memory storage.

The computer system also may employ a write buffer for temporarily storing selected data that is to be written from the cache memory to the general memory storage. The cache management software may logically organize the content of the write buffer prior to the time at which the contents of the write buffer are transferred to the general memory storage. As part of the transfer process, the file system software may allocate a new memory area in the general memory storage to relocate all of the data for a given file. The allocation may be based, at least in part, on the total amount of memory space needed to relocate the original data items of the given file and the data items of the write buffer for the given file to the new memory area. The relocated file data may be logically organized to increase physical locality of the data items within the general memory storage.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
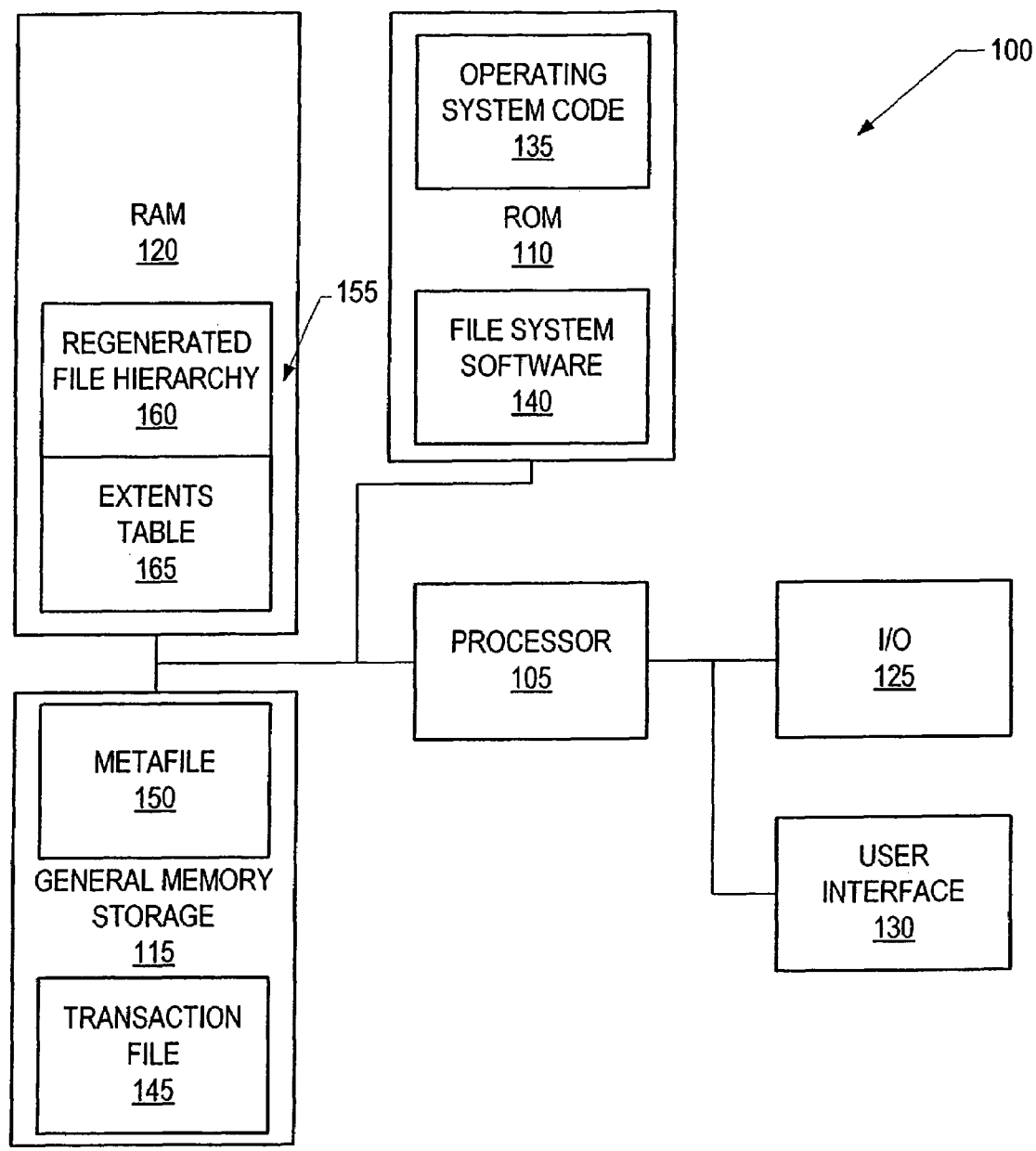
FIG. 1 shows the components of an exemplary computer system in which an optimized cache manager may be implemented.

FIG. 1 illustrates the components that may be employed in an exemplary computer system 100. As shown, the exemplary system 100 includes a processor 105, read only memory 110, and general memory storage 115. Computer system 100 also may include random access memory 120, an I/O interface 125, and a user interface 130. The particular components that may be used in computer system 100 may be tailored to the particular function(s) that may be to be executed by the computer system 100. Accordingly, the presence or absence of a component, other than processor 105, may be specific to the design criterion imposed on the computer system 100. For example, user interface 130 may be omitted when the computer system 100 is to take the form of an embedded controller or the like.

Read only memory 110 may include operating system code 135 that controls the interaction between high-level application programs executed by the processor 105 and the various hardware components, including memory devices 110 and 120, the general memory storage 115, and the interface devices 125 and 135. The operating system code 135 may include file system software 140 for organizing and controlling access to files stored in general memory storage 115. Alternatively, the file system software may be provided as a separate software component that merely interacts with the operating system code 135. In such instances, the code corresponding to the file system software 140 may be stored in read only memory 110, general memory storage 115 or the like. When the computer system 100 is networked with other computers and/or storage through I/O interface 125, the file system software 140 may be stored remotely and downloaded to computer system 100 as needed. FIG. 1 illustrates storage of the file system software 140 in read only memory 110.

The general memory storage 115 may take on any number of different forms. For example, the general memory storage 115 may take the form of a hard disc drive, floppy disk drive, etc. It also may be in the form of a non-rotating media device, such as non-volatile memory implemented in an integrated circuit format (i.e., flash memory, etc.). Still further, general memory storage 115 need not be limited to a single memory structure. Rather, general memory storage 115 may include a number of separate storages of the same type (i.e., all flash memory) and/or separate storages of different types (i.e., one or more flash memory units and one or more hard disk drives).

The files stored in the general memory storage 115 include data that is interpreted in accordance with a predetermined format implemented in an application program using the data stored in the file. Accordingly, the data stored within a given file may constitute the software code of an executable program, ASCII text of a database record, data corresponding to transactions executed (or not executed) by computer system 100, etc.

The file system software 140 organizes the files stored on the general memory storage 115. For example, the file system 140 may be employed to implement a transactional or log-based file system. An exemplary transactional or log-based system may be constructed from the components shown in FIG. 1. In this exemplary transactional system, a transaction file 145 is maintained in the general memory storage 115. The transaction file 145 may be used to keep records of the transactions associated with each file and directory of the general memory storage 115. Updates to the general memory storage 115 may be committed atomically based on the transaction records contained in transaction file 145. In one of its simplest form, every transaction record may be stored in a single logical page that is mapped to a physical block or sector of the general memory storage 115.

Figure 2:
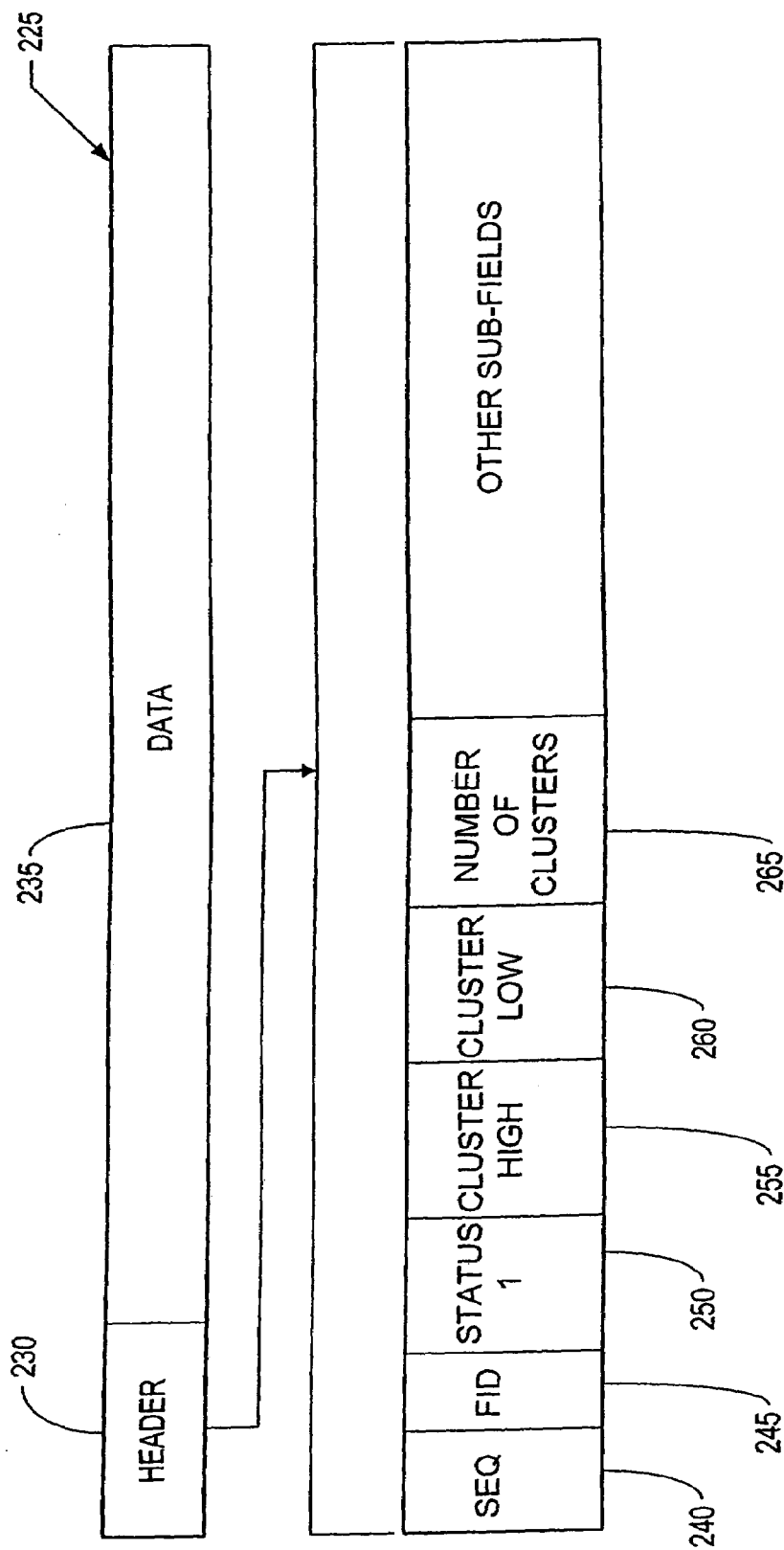
FIG. 2 illustrates one manner in which transaction records in a transaction file of a transaction based file system may be formatted.

One manner in which a transaction record 225 may be formatted for use in computer system 100 is shown in FIG. 2. As shown, transaction record 225 includes a header field 230 and a corresponding data field 235. The header field 230 may include a number of sub-fields. The sub-fields shown in FIG. 2 include a transaction sequence field 240, a file identification field 245, a transaction status field 250, a cluster high field 255, a cluster low field 260 and number of clusters field 265.

Each of the sub-fields of header field 230 has a meaning to the file system software 140. In this example, the transaction sequence field 240 is a monotonically increasing transaction identifier that is assigned by the file system software 140. When a new transaction record is added to the transaction file 145, the value stored in the transaction sequence field 240 of the new record may be increased by a predetermined amount over the value of the transaction sequence field of the preceding transaction record. Consequently, transaction records having larger transaction identifier values may be considered to have been added to the transaction file 145 later in time than transaction records having lower transaction identifier values. This chronological sequencing of the transactions, as represented by the value of the transaction sequence field 240 (and, in certain circumstances, the position of the transaction record within a logical block of the transaction file 145), allows the file system software 140 to apply (i.e., commit) the transactions in the proper order to maintain the integrity of the file system contents. Other ways of keeping track of the chronological sequencing of the transactions also may be used.

File system software 140 uses the transaction status field 250 to determine whether the transaction of the transaction record 225 has been committed. Once a transaction has been committed, further alteration of the committed transaction record 225 may be inhibited. This ensures consistency of the file system and also allows the file system to store the transaction file in, for example, write-once media, flash media, or the like.

The file identification field 245 identifies which file is affected by the transaction referenced in the transaction record 225. In most instances, the file identification field 245 is in the same format as the file record identifiers used in connection with a metafile 150 that, for example, resides in general memory storage 115. The cluster high field 255 and cluster low field 260 may be used by the file system software 140 to determine the starting address (or offset) at which the data 235 is to be written into the identified file, while the number of clusters field 265 is used to determine how many clusters of the identified may be overwritten by the data 235.

In this implementation of the file system, the file system software 140 may generate one or more metafiles that include records corresponding to each file and directory used in the file system. FIG. 1 shows a single metafile 150. Each record entry in metafile 150 corresponds to a single file or directory used in the file system. The unique file identifier, such as the one shown at 245, may be used by the file system software 140 to address a corresponding record of the metafile 120. If each record entry 125 has the same record length, the format for the file identifier 245 may be chosen so that it may be used, either directly or indirectly, as an index to the desired record in metafile 150. For example, file identifier 245 may constitute an offset value that may be used along with the memory address location of the first record of metafile 150 to calculate the memory address location of the first byte of the metafile record having the desired directory/file information.

After the computer system 100 has been started or powered on, the integrity of the file system may be verified by generating a reconstructed version of the file system in random access memory 35. The reconstructed file system, shown generally at 155 of FIG. 1, may be generated using the valid, committed transactions identified in the transaction file 145 and from the file/directory information stored in metafile 150. In FIG. 1, the reconstructed file system 155 includes a regenerated file hierarchy 160 and an extents table 165.

As noted above, general memory storage 115 may include one or more flash memory devices. Flash memory devices store information in logic gates, called "memory cells," each of which typically stores one bit of information. More recent advances in flash memory technology have also enabled such devices to store more than one bit per cell, sometimes referred to as multi-level cell devices. Additionally, flash memory is non-volatile, which means that the contents of the memory cells are not lost when power is removed from the device.

Figure 3:
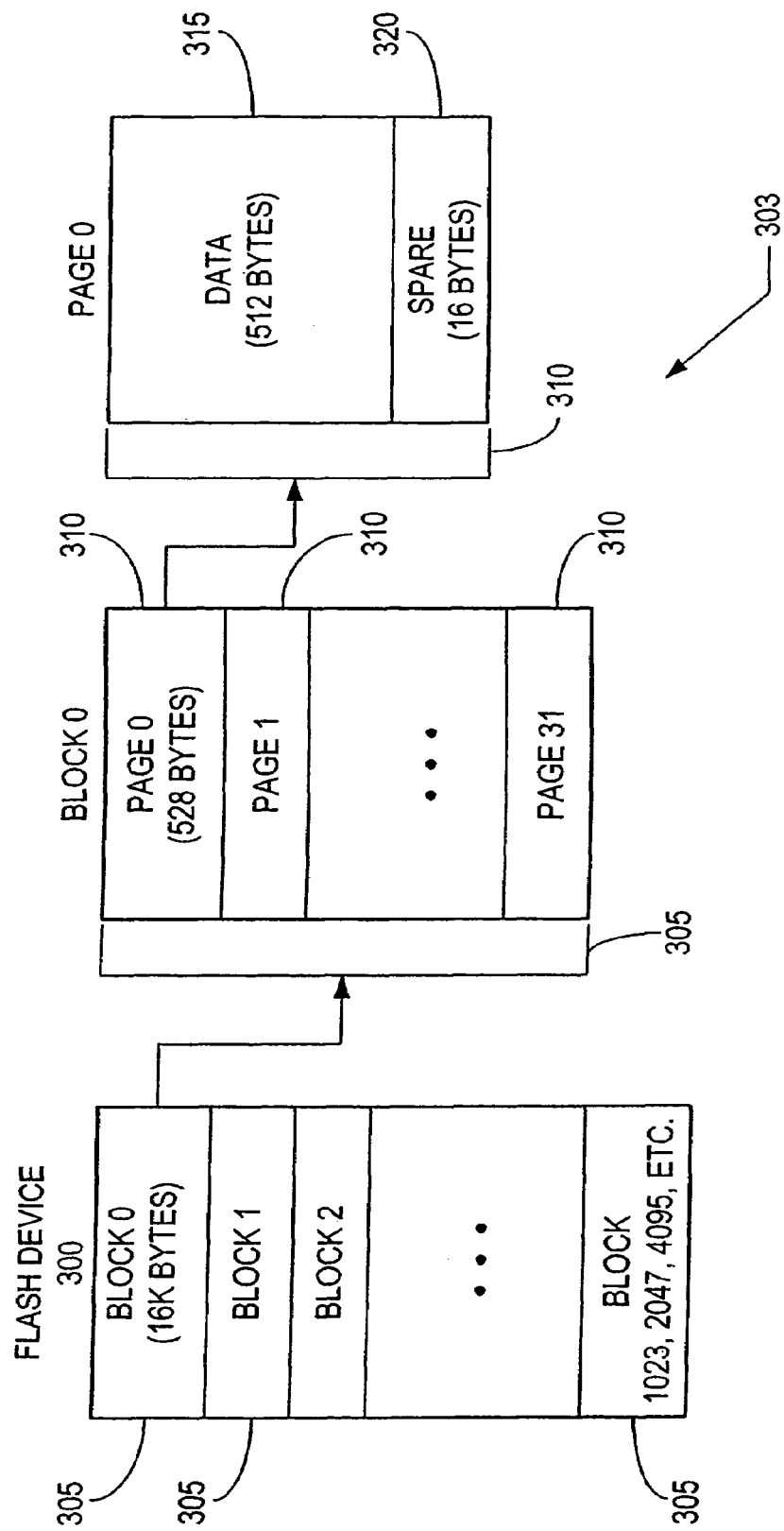
FIG. 3 illustrates the logical organization of one type of NAND flash memory device.

Although such flash device technology is constantly evolving, dominant technologies include NAND flash memory and NOR flash memory. NOR flash devices and NAND flash devices generally differ in the type of logic gate used for each storage cell. An exemplary logical architecture of one type of NAND flash memory device 300 is shown at 303 in FIG. 3. As illustrated, the available memory on the device 300 is organized into contiguous physical blocks 305 each having an equal number of memory cells (i.e., 16K bytes). NAND flash memory device 300 further divides each of the contiguous blocks 305 into a specific number of physical sectors or pages 310. Each physical page 310, in turn, may be further divided into a data area 315 and spare area 320. The data area 315 is normally reserved for storage of data, while the spare area 320 is typically reserved for maintenance of meta-information about the data stored in data area 315. The meta-information may include, for example, error-correcting codes used for verification and correction of sector contents, cyclic redundancy check data, etc.

The data area 315 and spare area 320 are typically set to specific sizes. For example, each page 310 of the exemplary NAND flash device 300 of FIG. 3 includes a data area 315 of 512 bytes and a spare area 320 of 16 bytes for a total page size of 528 bytes. In this example, the NAND flash device 300 also employs 32 pages 310 per block 305. Alternatively, other page sizes may be used. Many NAND devices include blocks having 64 pages, where each page includes 2112 bytes such that the data area 315 is 2048 bytes and the spare area 320 is 64 bytes.

Flash memory devices, such as NAND flash device 300, perform erase operations on an entire block 305 at a time. An erase operation may set all bits within the block 280 to a consistent state, such as a binary "1" value. Programming operations on an erased block 305 of flash device 300 changes the contents of an entire page 310. Once a page 310 is programmed, its state is not changed further until the entire block 305 is erased again. Reading of the contents of flash device 300 also may occur at the page level.

Figure 4:
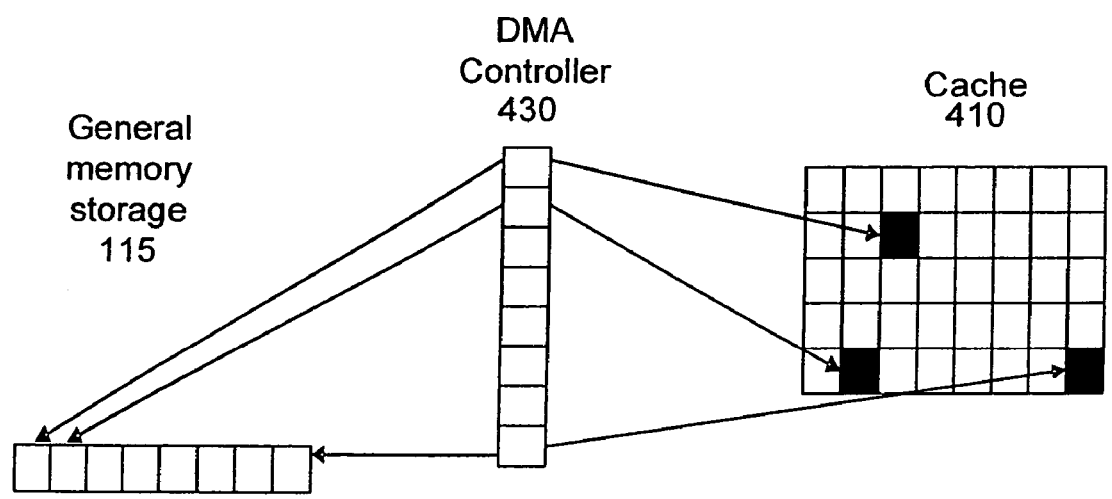
FIG. 4 illustrates one manner of constructing and organizing a cache system that employs a DMA controller.

Caches are employed to store recently used data items thereby reducing the need to access the general memory storage 115, or other slow storage, for each request by the applications and other programs executed on processor 105. Such caches are often implemented and maintained by cache management software that, for example, may be part of or separate from the file system software. When data is requested by an application or other program, the cache manager may first look to the cache, performing what is known as a cache lookup, to determine whether the data request can be fulfilled using cache data. In such a cache, the cache manager uses the physical address of the requested data to determine the location at which that item is stored in the cache. Accordingly, data in the cache includes a tag that identifies the data as being associated with a particular physical address. Because an application may request the data using its logical address as opposed to its physical address, the cache manager may be required to translate the request from a logical address request to a corresponding physical address request. After this translation, the cache manager maps the physical address to its corresponding location in the cache. If the data is found in the cache (cache hit), the cache data may be used to fill the request. If the data is not in the cache (cache miss), either because there is no data in that location in memory or that location in the cache includes data with a tag associated with a different physical address, the cache manager will retrieve the data from the corresponding memory device, such as general memory storage 115 to fill the request. As shown in FIG. 4, the physical location of a particular file or block on the memory 115 may not correspond with its location in the cache 410. Rather, the cache manager may store the data at seemingly arbitrary locations. In the example shown in FIG. 4, one or more DMA controllers 430 are employed to mediate data transfer between the memory 115 and cache 410.

Figure 5:
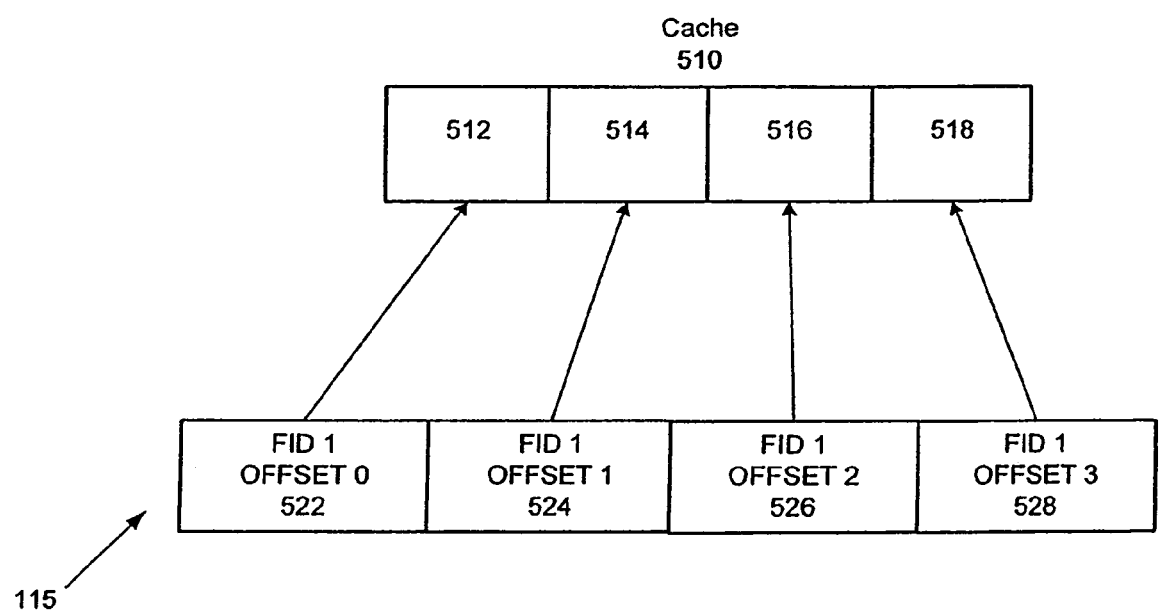
FIG. 5 is a data block diagram that illustrates one manner in which a cache manager may construct and organize a logically ordered cache.

An exemplary logically ordered cache 510 is shown in FIG. 5. In this example, the cache 510 includes a plurality of words 512, 514, 516, and 518. The size of each word 512, 514, 516, and 518 may correspond in size to a single page or sector of NAND flash memory, or to multiples of a single page or sector. Other sizes also may be used. Words 512, 514, 516, and 518 are organized by their logical addresses in the cache. For example, the offset of a particular data item within its file, as identified by the cluster low field 260 of the data item, may be used to map the data to the cache. The correspondence between the offset and cache word may be determined, for example, by the following equation: (offset) modulo (number of words in cache). Because further translation is unnecessary, the cache manager may be able to immediately begin performing a cache lookup. As illustrated, there may be four words in the cache. Accordingly, the cache manager maps each data item of the file 522, 524, 526, and 528 to a respective location in the cache memory 512, 514, 516, and 518 based on their offset within the original file.

The cache management software also may be used to ensure consistency between the data in the cache and data in the corresponding general memory storage. Different methodologies for maintaining this consistency may be used. For example, the cache manager may employ a write-through cache update technique in which the contents of the general memory storage is updated every time that the data in the cache is updated. Alternatively, the cache manager may employ an update technique in which the data in the general memory storage is updated only when its corresponding data in the cache is about to be overwritten.

The cache management software also may use write buffers to cluster writes to general memory storage. The data that is to be written to the general memory storage may be buffered in the write buffer, for example, until the buffer is full. By employing this technique, the cache management software may logically organize the contents of the write buffer. In turn, the cache management software may execute logically organized write operations from the write buffer to the general memory storage thereby increasing the potential for locality of reference of data within the original file. Sequential logical blocks are more likely to be located in the same physical location on the general memory storage 115 and at nearby storage locations. New files may be dynamically allocated to substantially contiguous physical locations of the general memory storage so that the locality of new data also may be maintained both physically and logically.

Figure 6:
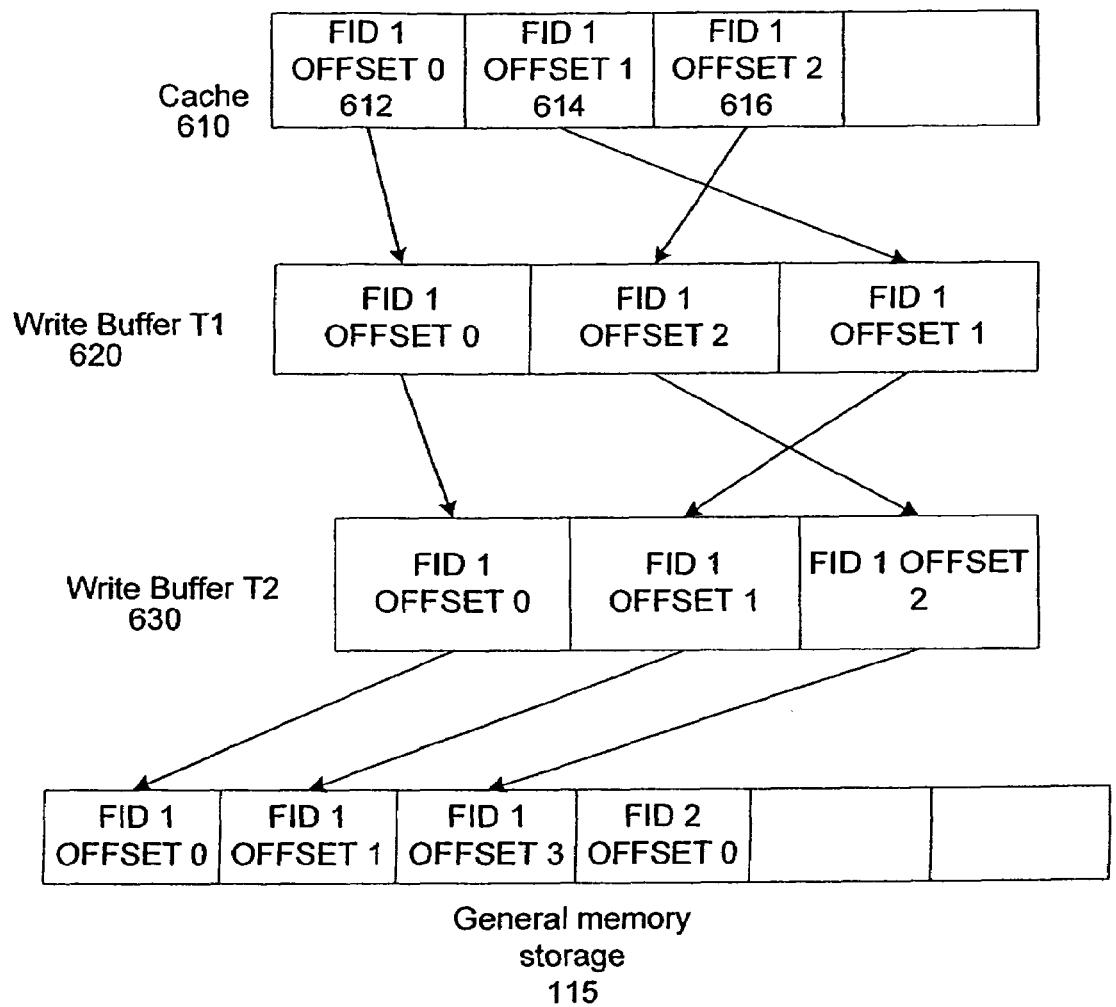
FIG. 6 is a data block diagram that illustrates one manner in which a cache manager may implement a logically ordered write operation.

An exemplary diagram setting forth one manner in which the cache management software may execute logically ordered write operations is shown in FIG. 6. In this example, the cache management software stores the words 612, 614, and 616 of the cache 610 in a write buffer 620 as the words are replaced in the cache. As shown, the sequence in which the data items are stored in the write buffer 620 may not correspond to the logical order of the data items. Rather, the order of the data items in a write buffer 620 depends on the order in which the cache write operations have occurred. The cache management software therefore may reorganize the data items of write buffer 620 to place them in logical order, as shown in the data item sequence of write buffer 630. Write buffer 630 may use the same memory area as write buffer 620 or, alternatively, may be implemented in a separate memory area. Ultimately, however, the contents of the write buffer 620 is logically ordered, and the ordered contents are written to a memory device 640, such as general memory storage 115, in a logically ordered write operation.

Figure 7:
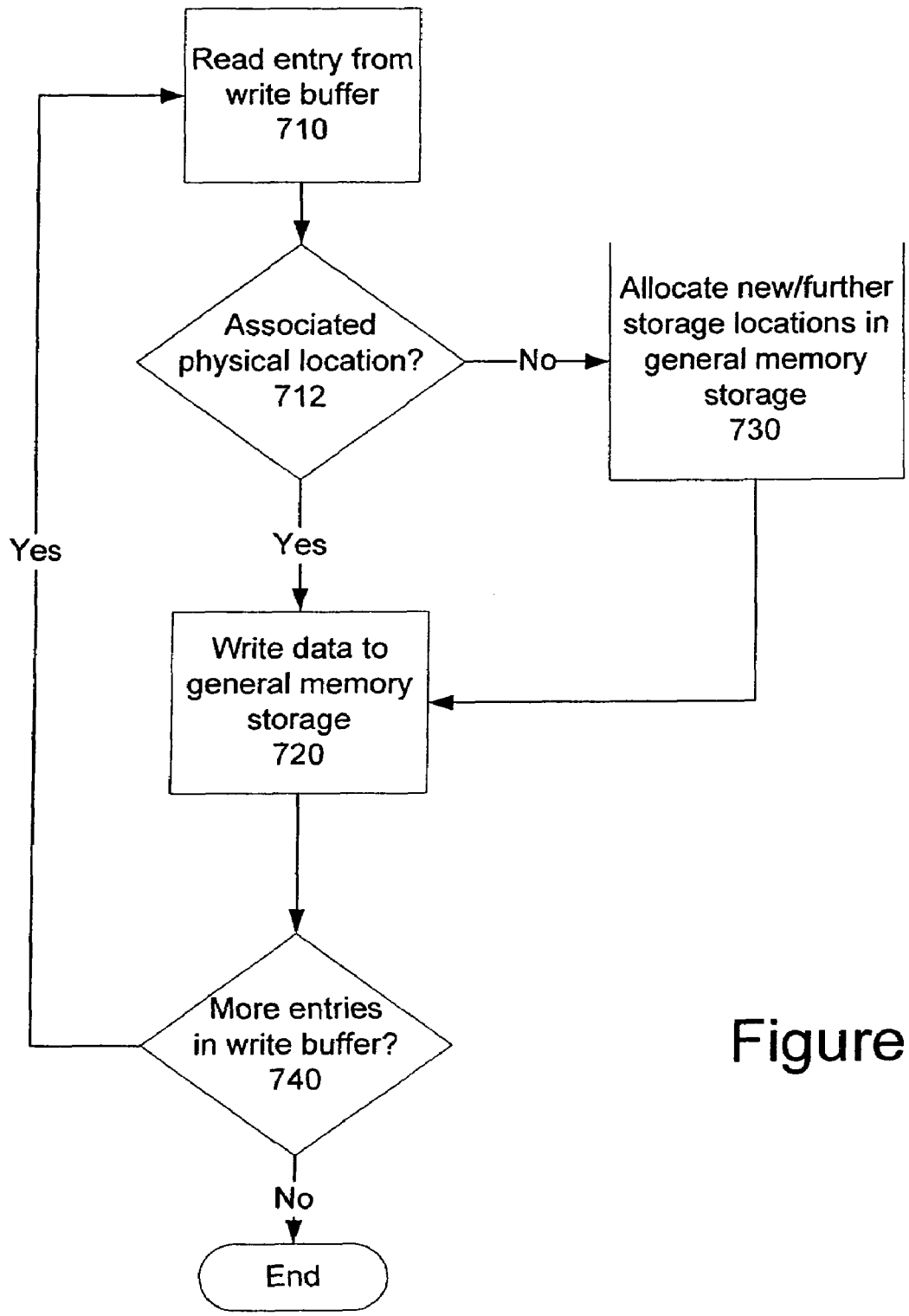
FIG. 7 is a flow chart illustrating a plurality of interrelated operations that may be executed to implement the logically ordered write shown in FIG. 6.

One manner in which data may be transferred from a write buffer to a memory device, such as general memory storage 115, pursuant to implementing a logically ordered write operation, is shown in FIG. 7. In this example, it is assumed that the write buffer has been organized so that its data entries are in logical order. With the data entries organized in this manner, the cache management software obtains a data item from the write buffer at block 710. If the data item entry was previously allocated to a corresponding physical location in general memory storage 115 as determined at 712, the data for the data item is written to general memory storage at the previously allocated location. This write operation takes place at block 720 of FIG. 7. If no prior allocation exists, the cache management software treats the data item as a new entry. A new entry is assumed when the data item is an extension of an existing file and/or a part of a new file for which space in general memory storage is to be allocated at block 730. Space in the general memory storage may be allocated to the new entry/extension according to various policies. For example, enough space may be allocated for the section to be written in its own data space. Alternatively, the file system may determine a file size that combines the original file data with the data to be written from the buffer and allocate enough space in general memory storage to relocate the entire file in the newly allocated space. This may be done, for example, by looking to file metadata information associated with and/or stored within the data item in the write buffer. Once space is allocated, the data may be written to general memory storage at block 720. The file system may then determine if more entries need to be serviced at block 740, and repeat the process until the write buffer is empty.

Logically organizing the data items in the write buffer makes it easier for the cache management software and/or file system software to allocate contiguous portions of the physical space of general memory storage 115 in logical order, thereby maintaining the physical locality of logical addresses. The effectiveness of sequential read-ahead operations from storage organized in this manner may thus be increased. To this end, the cache management software and/or file system software obtains a data item requested by an application or other process in a read operation. Since many read operations occur statistically within a given range of data items that are logically disposed before and after the requested data item, the cache management software may fill at least a portion of the cache memory with the data in this contiguous range in an effort to increase the likelihood of a subsequent cache hit. The data in this contiguous range typically will be logically organized based on the position of the data within the corresponding file. Accordingly, more cache hits are likely to occur during subsequent data requests.

One way to ensure that logical ordering is maintained at all levels of memory (including writes to and from the cache) is by moving data to or from the cache in logically organized discrete sections. Each section may include multiple words. The cache management software may allocate an entire section of general memory storage 115 when a particular data item is written to or erased from the cache (referred to as flush and fill operations). In effect, the cache management software may treat each section as a single, multiword cache entry. For example, the cache may include a single multiword section corresponding in size to a block of NAND flash memory, having words corresponding in size to pages or sectors. Other sizes also may be used. Alternatively, or additionally, the cache may include a number of sections at various predetermined granularities, allowing cache space to be allocated in various sizes. Cache flush and fill policies may vary to account for the various granularities. The words within a section also may be logically ordered. For example, the data item's offset within a file may be used as an index to order the words within a section of the cache. Consequently, data for a particular file may be mapped to sequential locations in the same section of the cache. Additionally, or alternatively, the cache may allocate sections on a file-by-file basis. For example, the cache management software may map each file to one or more cache memory sections based, for example, on its file identifier. For example, where the file identifier is a number, the correspondence between a file and its cache section may be determined by the following equation: (file identifier) modulo (number of sections in the cache). The file identifier also may be used to associate a particular data item with a corresponding section in the cache memory. Other methods or information also may be used to logically organize the cache and corresponding general memory storage.

Figure 8:
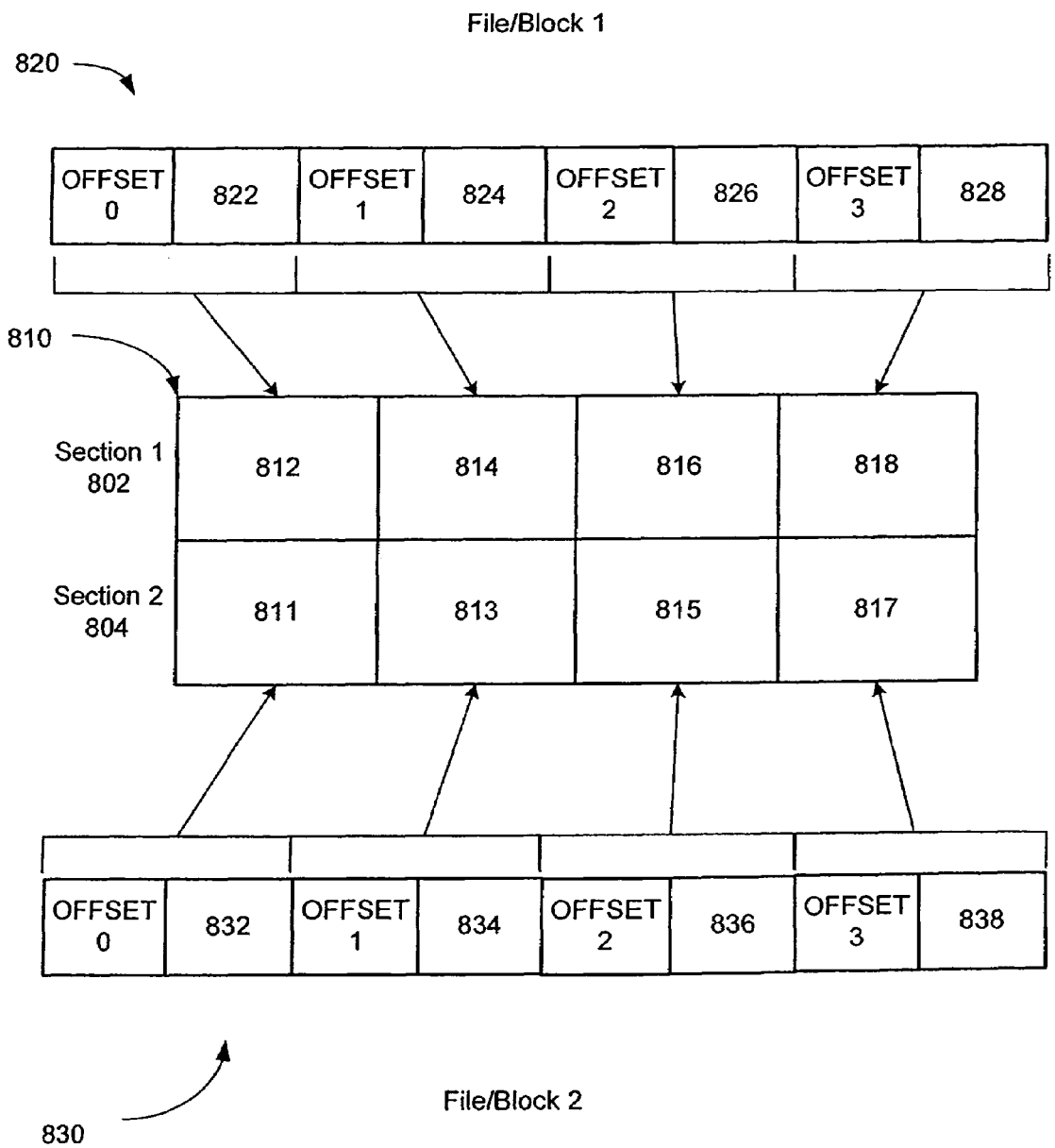
FIG. 8 is a data block diagram that illustrates one manner in which a cache manager may implement a logically ordered sectional cache.

One manner of organizing a logically ordered sectional cache 810 is shown in FIG. 8. As illustrated, the cache 810 may include two multiword sections of a predetermined granularity, in this case 4 words each. In this example, a first file 820 is located in general memory storage. The first file 820 contains four data items, where a first data item 822 is at offset 0, a second data item 824 is at offset 1, a third data item 826 is at offset 2, and fourth data item 828 is at offset 4. The cache management software maps data items having a file identifier of 1 to the first section 802 of the cache 810. Accordingly, the data items 822, 824, 826, and 828 in the file 820 map to words 812, 814, 816, and 818 in the first cache section 802 section based on their respective offsets. When filling the multiword section of the cache with data for a particular file, each word of the cache 810 may be filled with logically sequential data items of the file in a generally concurrent manner. For example, each of the data items 822, 824, 826, and 828 of the file 820 may be copied from general memory storage to cache 810 and mapped to the words 812, 814, 816, and 818 of the cache 810 whenever an application or other process initially makes a read request for any of the data items 822, 824, 826, and 828 of file 820. In the example shown in FIG. 8, a second file 830 is likewise stored in general memory storage. The second file 830 includes four data items, a first data item 832 at offset 0, a second data item 834 at offset 1, a third data item 836 at offset 2, and a fourth data item 838 at offset 4. The cache management software maps data items having, for example, a file identifier of 2 to the second section 804 of the cache 810. Accordingly, each of the data items 832, 834, 826, and 828 in the file 830 map to words 811, 813, 815, and 817 in the second section 804 of the cache 810 and are logically ordered based on their respective offsets. As above, each of the data items 832, 834, 836, and 838 of the file 830 may be copied from general memory storage to cache 810 and mapped to the words 812, 814, 816 and 818 of the cache 810 whenever an application or other process initially makes a read request for any of the data items 832, 834, 836, and 838 of file 820.

Figure 9:
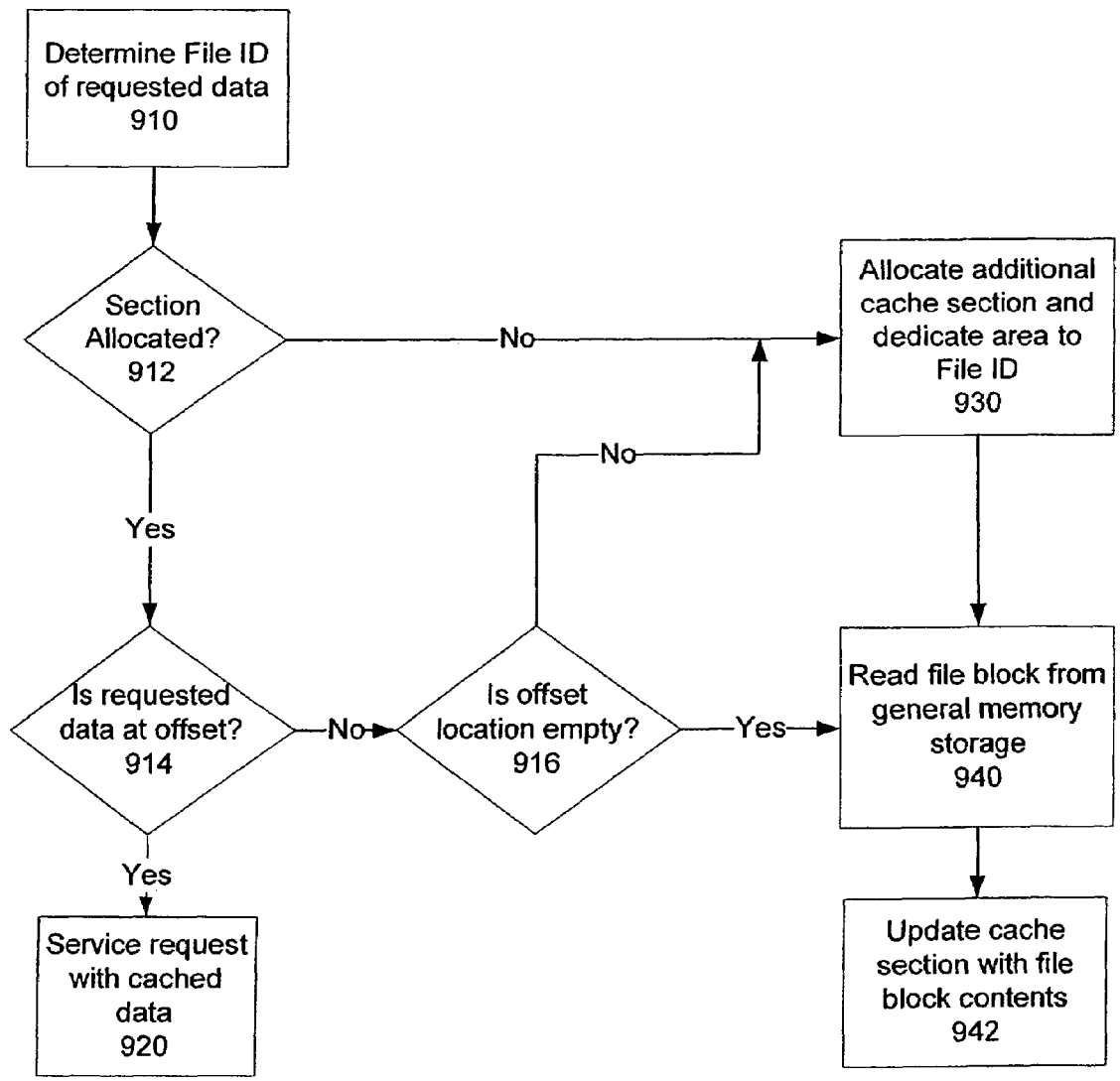
FIG. 9 is a flow chart illustrating a plurality of interrelated operations that may be executed to service cache misses in a sectional cache of the type shown in FIG. 8.

One manner in which the cache management software may perform a cache lookup and service a cache miss for a sectional cache is shown in FIG. 9. In this example, the file identifier and offset of the requested data is determined at block 910. The cache management software may then determine if a section of the cache has already been allocated to this file. If so, the logical offset for the data item may be used to determine which word in the allocated section corresponds to the requested data at block 912. The cache management software compares the tags of the cached and requested items at block 914 to determine whether the cached data item corresponds to the requested data item. If the tags indicate a correspondence, then a cache hit has occurred and the read request may be service with data from the cache at block 920. If the tags are different, or if no section has yet been allocated for this file, an additional section of the cache may be allocated to the file at block 930. In either case, or if the contents of the word in an allocated section is empty, as at block 916, the request may be serviced by reading the data from general memory storage at block 940 and updating the contents of the cache. Cache contents may be updated by copying the entire block on which requested data resides into a section of the cache at block 942. Copying the entire contents of a section into the cache concurrently results in the seamless integration of read-ahead functionality, automatically introducing an entire section of physically and logically local data items. Additionally, the cache management software may be configured to perform section read-ahead operations, where the cache management software may look ahead to logically and/or physically contiguous sections of the general memory storage and load those sections into corresponding sections of the cache.

Figure 10:
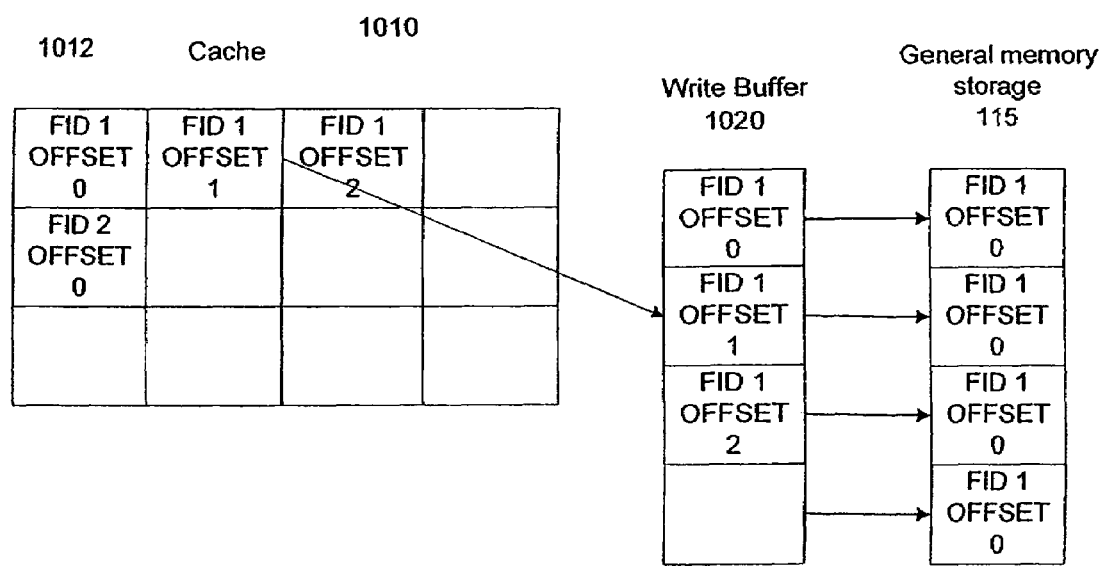
FIG. 10 is a data block diagram that illustrates one manner in which a cache manager may implement a logically ordered write operation in a system employing a sectional cache of the type shown in FIG. 8.

When data in a particular cache section is replaced, its contents may need to be updated on the general memory storage. One manner of executing such an update operation is shown FIG. 10. In this example, a section 1012 of the cache 1010 is copied to a write buffer 1020 before section 1012 is overwritten by other data. As a result, the write buffer 1020 includes logically ordered data items associated with, for example, a given file (i.e., FID 1). The contents of the write buffer 1020 may be written to the corresponding portions 1040 of general memory storage in logical order in a subsequent write operation.

Figure 11:
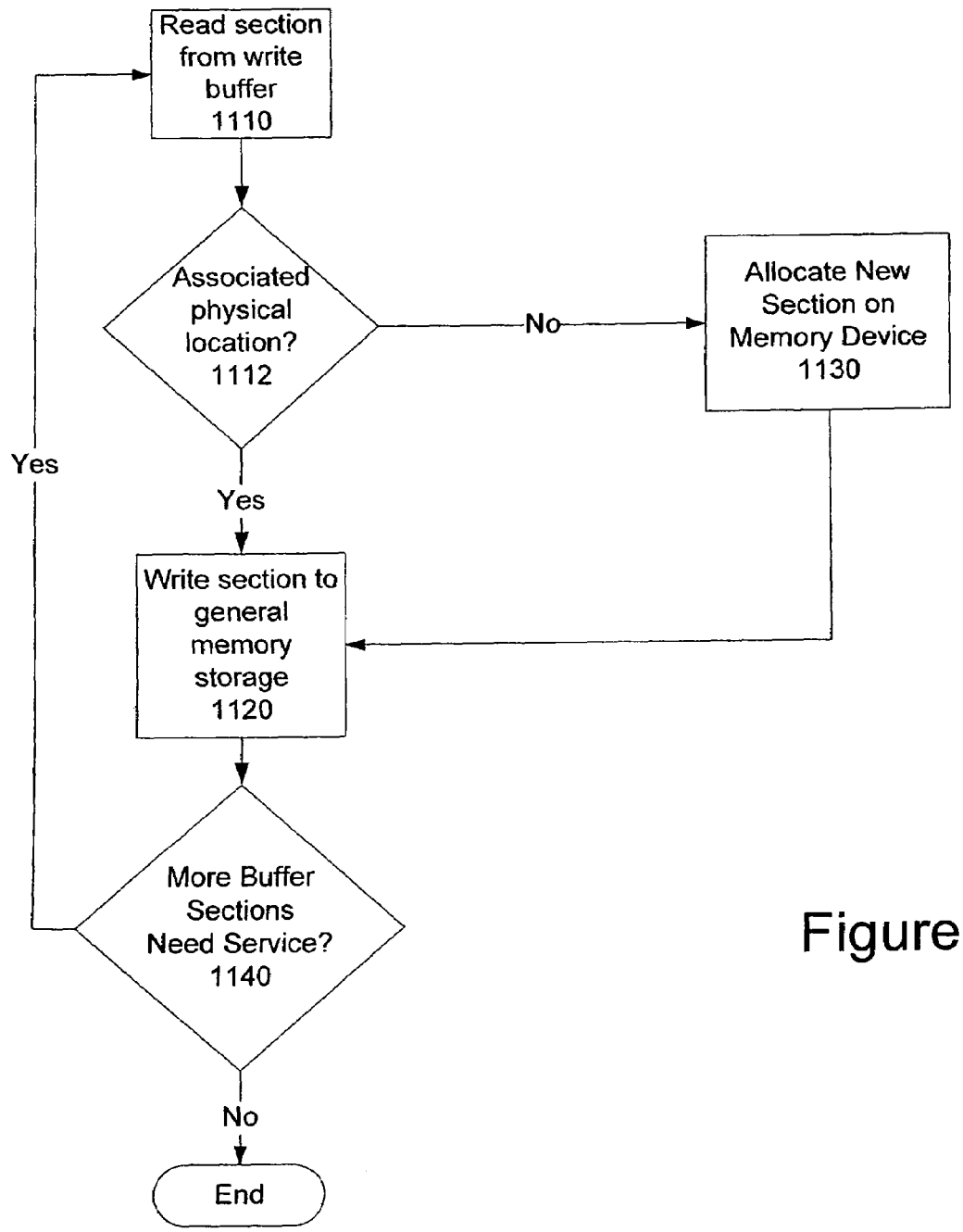
FIG. 11 is a flow chart illustrating a plurality of interrelated operations that may be executed to write sections of data from a write buffer to general memory storage.

One manner in which the cache management software may copy data from a write buffer to general memory storage is shown in FIG. 11. In this example, the cache management software reads a plurality of the data items from a section the write buffer at block 1110. If the data items in the section have a corresponding physical allocation in the memory as determined at 1112 (i.e., the data has been previously written to general memory storage), the data is written to the general memory storage in the previously allocated section of the general memory storage at block 1120. If no prior allocation exists, the data items may be part of a new file for which a new allocation of space on general memory storage 115 is made at block 1130. Alternatively, the data items may be part of an existing file that extends beyond the memory area currently allocated for the file on general memory storage 115. Accordingly, space on general memory storage 115 may be allocated according to various policies. For example, one or more blocks of flash memory may be allocated to store a single, corresponding section of the cache. Further, the file system and/or cache management software may allocate enough space in general memory storage 115 to move the existing file data stored in general memory storage 115 as well as the additional section of data items stored in the write buffer to contiguous areas of general memory storage 115 so that the entire file is logically organized. This may be done, for example, by looking to file meta-data information stored within the data items in the write buffer and, if necessary, meta-data information for the original file. Once space is allocated, the data is written to general memory storage 115 at block 1120. The file system and/or cache management software may then determine if more sections of the write buffer need to be serviced at block 1140, and repeat the process until all data contained in the write buffer has been completely serviced. Alternatively, servicing of the write buffer contents may be done on a periodic basis, a basis determined by the contents of the write buffer (i.e., number of data items in the write buffer, type of data items in the write buffer, etc.), and the like.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A computer system comprising:
   a processor;
   general memory storage;
   cache memory for temporarily storing selected data requested from the general memory storage;

cache management software executable by the processor for managing the contents of the cache memory pursuant to cache hit and cache miss criterion, where the cache management software dedicates physically contiguous memory locations of the cache memory to an individual file and organizes the cache memory dedicated to the individual file so that data items of the individual file are ordered in sequential physical locations of the physically contiguous memory in sequential order of the logical addresses of the data items;

a write buffer for temporarily storing selected data that is to be written from the cache memory to the general memory storage, where the write buffer includes physically contiguous memory locations dedicated to the individual file so that data items of the individual file are ordered in the physically contiguous locations of the write buffer in sequential order of the logical addresses of the data items of the individual file;

where the cache management software organizes the contents of the write buffer, and where organization of the contents of the write buffer occurs prior to the writing of the write buffer contents to the general memory storage;

file system software executable by the processor for managing file data and file system structure of files stored on the general memory storage; and where the file system software allocates a new memory area in the general memory storage based on a total amount of memory space needed to relocate the original data items of a given file and the data items of the write buffer for the given file to the new memory area.

2. The computer system as claimed in claim 1, where the file system software organizes the given file in physically contiguous memory locations of the new memory area so data items of a given file are ordered in sequential physical locations of the physically contiguous memory locations of the new memory area in sequential order of logical addresses of the data items.

3. The computer system as claimed in claim 1, where the general memory storage comprises flash memory.

4. The computer system as claimed in claim 1, where the general memory storage comprises rotating disk memory.

5. A computer system comprising:
a processor;
general memory storage;
cache memory for temporarily storing selected data requested from the general memory storage;
cache management software executable by the processor for managing the contents of the cache memory pursuant to cache hit and cache miss criterion, where the cache management software allocates a first memory section of physically contiguous memory locations of the cache memory to data items of a first file, where physically contiguous memory locations of the first memory section are allocated sequentially to data items of the first file sequentially in order of logical addresses of data items of the first file, and a second memory section of physically contiguous memory locations of the cache memory to data items of a second file, where physically contiguous memory locations of the second memory section are allocated sequentially to data items of the second file in order of logical addresses of data items of the second file;

a write buffer for temporarily storing selected data items of the first and/or second file that are to be written from the cache memory to the general memory storage, where the write buffer includes one or more sections allocated to the first and/or second file that are organized so that data items of an individual file in its corresponding section are ordered sequentially in sequential physical locations of physically contiguous memory locations of the one or more sections allocated to the first and/or second file in sequential order of logical addresses of the data items of the respective first and/or second file;

where the cache management software logically organizes the contents of the write buffer, and where logical organization of the contents of the write buffer occurs prior to the writing of the write buffer contents to the first and/or second files in the general memory storage;

file system software executable by the processor for managing file data and file system structure of files stored on the general memory storage; and where the file system software allocates a new memory area in the general memory storage for the first file based on a total amount of memory space needed to relocate original data items of the first file and the data items of the write buffer for the first file to the new memory area in the general memory storage.

6. The computer system as claimed in claim 5, where the file system software further allocates a further new memory area for the second file in the general memory storage based on a total amount of memory space needed to relocate original data items of the second file and the data items of the write buffer for the second file to the further new memory area in the general memory storage.

7. The computer system as claimed in claim 5, where the general memory storage comprises flash memory.

8. The computer system as claimed in claim 5, where the general memory storage comprises rotating disk memory.

* * * * *